(12) United States Patent
Chen et al.

(10) Patent No.: US 10,552,177 B2
(45) Date of Patent: Feb. 4, 2020

(54) METHOD FOR PRELOADING APPLICATION, STORAGE MEDIUM, AND TERMINAL DEVICE

(71) Applicant: Guangdong Oppo Mobile Telecommunications Corp., Ltd., Dongguan, Guangdong (CN)

(72) Inventors: Yan Chen, Guangdong (CN); Yaoyong Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/180,350

(22) Filed: Nov. 5, 2018

(65) Prior Publication Data

US 2019/0188005 A1 Jun. 20, 2019

(30) Foreign Application Priority Data

Dec. 20, 2017 (CN) .......................... 2017 1 1384834

(51) Int. Cl.
*G06F 3/00* (2006.01)
*G06F 9/445* (2018.01)
(Continued)

(52) U.S. Cl.
CPC ............ *G06F 9/4451* (2013.01); *G06F 1/329* (2013.01); *G06F 9/542* (2013.01); *G06F 11/302* (2013.01); *G06F 11/3438* (2013.01)

(58) Field of Classification Search
CPC ....................................................... G06F 9/54
(Continued)

(56) References Cited

U.S. PATENT DOCUMENTS

2012/0324359 A1* 12/2012 Lee ........................... G06F 8/38
715/733
2013/0173513 A1 7/2013 Chu et al.
(Continued)

FOREIGN PATENT DOCUMENTS

CN 103677922 A 3/2014
CN 104657183 A 5/2015
(Continued)

OTHER PUBLICATIONS

Ron Brightwell, Scalable Parallel Application Launch on CplantTM. (Year: 2001).*
(Continued)

*Primary Examiner* — Lechi Truong
(74) *Attorney, Agent, or Firm* — Young Basile Hanlon & MacFarlane, P.C.

(57) ABSTRACT

A method for preloading an application, a storage medium, and a terminal device are provided. The method includes the following. First status feature information of a terminal device is acquired in response to an application-preloading-prediction event being detected to be triggered. The first status feature information is compared with a plurality of pre-collected samples of a sample set. The plurality of pre-collected samples include status second feature information of the terminal device in a preset sampling period, and each sample of the plurality of pre-collected samples corresponds to a sample tag indicating a next application to be launched. A target application to be launched is predicted according to a comparison result. The target application is preloaded.

15 Claims, 5 Drawing Sheets

(51) Int. Cl.
  *G06F 1/329* (2019.01)
  *G06F 11/30* (2006.01)
  *G06F 11/34* (2006.01)
  *G06F 9/54* (2006.01)

(58) Field of Classification Search
  USPC .......................................................... 719/310
  See application file for complete search history.

(56) References Cited

U.S. PATENT DOCUMENTS

| | | |
|---|---|---|
| 2014/0366041 A1 | 12/2014 | Stanley-Marbell et al. |
| 2014/0372356 A1 | 12/2014 | Bilal et al. |
| 2016/0117260 A1 | 4/2016 | Wu et al. |
| 2016/0364272 A1 | 12/2016 | Hou et al. |
| 2017/0353860 A1* | 12/2017 | Zhang ................... H04W 12/08 |
| 2019/0196849 A1* | 6/2019 | Chen ..................... G06F 9/4491 |

FOREIGN PATENT DOCUMENTS

| | | |
|---|---|---|
| CN | 106843961 A | 6/2017 |
| CN | 107295044 A | 10/2017 |

OTHER PUBLICATIONS

Anonymous:"K-nearest neighbors algorithm—Wikipedia", Sep. 9, 2016, XP055378461.
Extended European search report issued in corresponding European application No. 18204265.5 dated May 20, 2019.
International search report issued in corresponding international application No. PCT/CN2018/112252 dated Jan. 30, 2019.

\* cited by examiner

METHOD FOR PRELOADING APPLICATION, STORAGE MEDIUM, AND TERMINAL DEVICE

CROSS-REFERENCE TO RELATED APPLICATION(S)

This application claims priority to Chinese Patent Application No. 201711384834.7, filed on Dec. 20, 2017, the content of which is hereby incorporated by reference in its entirety.

TECHNICAL FIELD

This disclosure relates to the technical field of terminal devices, and particularly to a method for preloading an application, a storage medium, and a terminal device.

BACKGROUND

Currently, with the rapid development of terminal device technologies, smart devices such as smart phones, tablet computers, and smart televisions have become indispensable electronic devices in people's lives.

Various applications (application software, APP) are installed on the terminal device. Generally, an application starts to be loaded when the user opens the application. Loading time becomes longer with increasing storage space that the application occupies, which wastes the user's precious time. In order to make the application run more smoothly, some terminal devices may prepare loading resources for some applications in advance, that is, preload some applications in advance.

However, the applications cannot be preloaded at will, because when too many resources are preloaded, too much storage space will be taken up, and the power consumption will become large, which may affect fluency on the use of the terminal seriously. Therefore, it is important to optimize the preloading mechanism and reduce the power consumption of the terminal.

SUMMARY

Implementations of the disclosure provide a method for preloading an application, a storage medium, and a terminal device.

According to a first aspect of the implementations of the disclosure, a method for preloading an application is provided.

First status feature information of a terminal device is acquired in response to an application-preloading-prediction event being detected to be triggered. The first status feature information is compared with a plurality of pre-collected samples of a sample set. The plurality of pre-collected samples include second status feature information of the terminal device in a preset sampling period, and each sample of the plurality of pre-collected samples corresponds to a sample tag indicating a next application to be launched. A target application to be launched is predicted according to a comparison result. The target application is preloaded.

According to a second aspect of the implementations of the disclosure, a terminal device is provided. The terminal device includes at least one processor and a computer readable storage. The computer readable storage is coupled to the at least one processor and stores at least one computer executable instruction thereon which, when executed by the at least one processor, causes the at least one processor to carry out the following actions.

First status feature information of a terminal device is acquired in response to an application-preloading-prediction event being detected to be triggered. The first status feature information is compared with a plurality of pre-collected samples of a sample set. The plurality of pre-collected samples include second status feature information of the terminal device in a preset sampling period, and each sample of the plurality of pre-collected samples corresponds to a sample tag indicating a next application to be launched. A target application to be launched is predicted according to a comparison result. The target application is preloaded.

According to a third aspect, a non-transitory computer readable storage medium is provided. The non-transitory computer readable storage medium is configured to store a computer program which, when executed by a processor, causes the processor to carry out the following.

First status feature information of a terminal device is acquired in response to an application-preloading-prediction event being detected to be triggered. The first status feature information is compared with a plurality of pre-collected samples of a sample set. The plurality of pre-collected samples include second status feature information of the terminal device in a preset sampling period, and each sample of the plurality of pre-collected samples corresponds to a sample tag indicating a next application to be launched. A target application to be launched is predicted according to a comparison result. The target application is preloaded.

DETAILED DESCRIPTION

Technical solutions of the present disclosure will be further described below through implementations with reference to the accompanying drawings. It will be appreciated that the implementations are described herein for the purpose of explaining the disclosure rather than limiting the disclosure. In addition, it should also be noted that, for the convenience of description, only some rather than all structures related to the present disclosure are illustrated in the accompanying drawings.

Before discussing the exemplary implementations in more detail, it should be mentioned that some exemplary implementations are described as processes or methods of a flowchart. In the flowchart, although each step is depicted as being processed sequentially, some of these steps may be performed in parallel, concurrently, or simultaneously. In addition, the order of the steps can be rearranged. The process of one step may be terminated when a corresponding operation is completed, but the implementations may also have additional steps that are not illustrated in the accompanying drawings. The process may correspond to a method, a function, a protocol, a subroutine, a subprogram, and the like.

Preloading an application of a terminal device is a common and effective method for improving user experience. Preparing loading resources for some applications in advance allows the applications to run more smoothly.

In the related art, applications are preloaded mainly based on a statistical method. For example, when there are only a few applications that are most frequently used, all these applications will be preloaded. However, there are usually many applications installed in the terminal device. An infrequently-used application may be used at present, and a frequently-used application may not be used at present. Therefore, for related preloading methods, the prediction accuracy of preloading an application is not enough, and too many resources need to be preloaded, which wastes a lot of storage space and affect overall performance of the terminal device.

Taking the above into consideration, a method for preloading an application, a storage medium, and a terminal device are provided. According to the technical solution for preloading an application, the first status feature information of the terminal device is acquired in response to an application-preloading-prediction event being detected to be triggered. Then, the first status feature information is compared with the plurality of pre-collected samples of the sample set, where the plurality of pre-collected samples include the status feature information of the terminal device in the preset sampling period, and each sample of the plurality of pre-collected samples corresponds to the sample tag indicating the next application to be launched. Thereafter, the target application to be launched is predicted according to the comparison result and then preloaded. By means of the above technical solution, an application to be launched can be predicted according to current usage status of the terminal device, status recorded during history usage process, and habits of launching applications of the user, and then the application is preloaded, therefore the application to be launched can be predicted accurately, thus improving launching speed of the application under the precondition of saving storage space.

Figure 1:
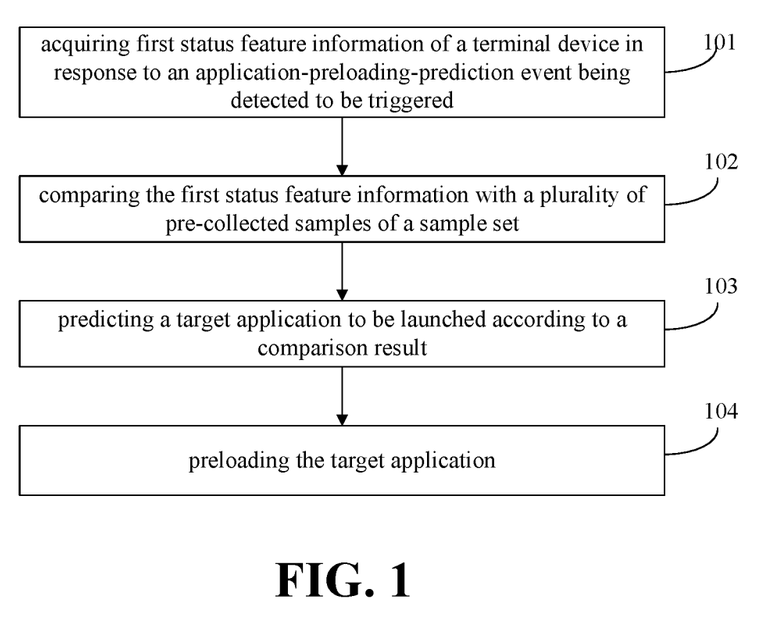
FIG. 1 is a schematic flow chart illustrating a method for preloading an application according to an implementation of the present disclosure.

FIG. 1 is a schematic flow chart illustrating a method for preloading an application according to an implementation of the present disclosure. The method can be implemented by an apparatus for preloading an application. The apparatus for preloading an application can be implemented with software and/or hardware and can be generally integrated in a terminal device. As illustrated in FIG. 1, the method can begin at block 101.

At block 101, first status feature information of the terminal device is acquired in response to an application-preloading-prediction event being detected to be triggered.

As an implementation, the first status feature information of the terminal device can be used as a sample. The sample can include at least one feature.

As an implementation, the terminal device in the implementations of the present disclosure can include a smart phone, a tablet computer, a laptop, and other mobile devices.

The trigger conditions of the application-preloading-prediction event are not limited in the implementations of the present disclosure. As an implementation, the trigger conditions can include at least one of: the mobile is detected to be powered on, the screen of the terminal device is detected to be lit up, the terminal device is detected to be successfully unlocked, a certain application or a preset application is detected to be launched, a accumulative duration of using a current application (or a preset application) is detected to reach a preset usage duration threshold, and the terminal device is detected to be in a preset usage status, such as being held by the user or being picked up by the user.

In response to the application-preloading-prediction event being detected to be triggered, the first status feature information of the terminal device is acquired for following operations of comparing the first status feature information with a plurality of pre-collected samples of a sample set, where the samples include status feature information of the terminal device in a preset sampling period.

In the implementation of the present disclosure, the first status feature information refers to current status feature information of the terminal device, and the pre-collected samples of the sample set include history status feature information.

As an implementation, the status feature information in the implementations of the present disclosure includes at least one of time information, switch status of mobile data network, and connection status of a wireless hotspot. As another implementation, the status feature information can further include at least one of schedule information, date category, identity information of a connected wireless hotspot, a current running application, a previous foreground application, plugging and unplugging status of a headphone jack, charging status, power information of a battery, display duration of a screen, motion status of the terminal device, and location information of the terminal device, which is not limited herein.

In this implementation, the first status feature information of the terminal device can be regarded as a sample. The sample can include at least one feature. The at least one feature can include the above-mentioned time information, switch status of mobile data network, connection status of a wireless hotspot, schedule information, date category, identity information of a connected wireless hotspot, a current running application, a previous foreground application, plugging and unplugging status of a headphone jack, charging status, power information of a battery, display duration of a screen, and motion status of the terminal device.

Taking the time information as an example, for the terminal device, requirements of the user on applications are different at different time or in different time periods, and the time information is used as a feature (or an attribute) of the sample. As an implementation, the time information may be a current system time of the terminal device or a time period to which the current system time belongs. The time period can be a certain day of a week (such as Monday or Sunday), or can be a certain time period of a day (such as a time period from 6 am to 8 am). Different time or different time periods can indicate that the user is in different statuses. As an implementation, during the working days from Monday to Friday, the user is generally in a working status, and the user generally uses office or social applications. Saturday, Sunday, and statutory holidays are days off work, the user is generally in a leisure status, and he or she generally uses game or leisure applications. For workdays, for example in a time period from 6 am to 8 am, the user is generally on the way to work, and may use a news client to browse news; in a time period from 9 am to 11 am, the user is generally in office, and may use a mailbox client; in a time period from 12 am to 1 pm, the user may use a take-out application to order meals; in a time period from 6 pm to 6:10 pm which is a time period to get off work, the user may use a car-hailing application to take a taxi, and the like. In addition, schedule information of the user can be further acquired, which can be configured to correct the time information. For example, on a Monday, the schedule information indicates that the user is on vacation, and then a corresponding workday can be corrected to a day off work.

In order to improve the accuracy of a prediction result, more status parameters of the terminal device can be adopted in the implementations of the present disclosure, such as the switch status of the mobile data network and/or the connection status of the wireless hotspot.

Currently, with the rapid development of Internet technology, many functions of applications of the terminal device rely on network, such as mobile payment, browsing webs, watching videos online, or chatting through social applications. The network here can refer to mobile data network (that is, cellular mobile network) provided by a network operator (for example, in China, the network operator can include China Mobile®, China Unicom®, China Telecom®, and the like), or can refer to a wireless local area network (WLAN) generated according to WLAN technology, such as wireless fidelity (WiFi) technology.

The WLAN has an ability to access internet, and the terminal device can access the internet by connecting to a wireless hotspot in the WLAN. The user needs to pay a certain data traffic fee to the network operator to use the mobile data network. Therefore, when there is an available wireless hotspot (such as a WiFi hotspot) around, the user generally prefers to access the internet by connecting to the wireless hotspot. In addition, many users may also choose to turn off the mobile data network, in order to prevent some applications of the terminal device from consuming data traffic without the user's knowledge. In addition, in terminal devices, different applications require different networking functions, and data traffic of different applications consumed during usage is also different.

Taking the above into consideration, in the implementations of the present disclosure, the switch status of the mobile data network and/or the connection status of the wireless hotspot can be used as features of the sample to improve the accuracy of predicting the application to be loaded. When the switch status of the mobile data network is an "on" status, it may indicate that there is probably no wireless hotspot in current environment, and the user may choose to use an application with less data traffic consumption. When the switch status of the mobile data network is an "off" status, the user may choose to use an application not relying on network or to use any application by connecting to a WiFi hotspot. When the connection status of the wireless hotspot is a "connected" status, the user may use any application. When the connection status of the wireless hotspot is a "disconnected" status, the user may use an application with less data traffic consumption.

In the implementations of the present disclosure, at least one of the time information, the switch status of the mobile data network, and the connection status of the wireless hotspot can be used for comparison, which makes it possible to divide statuses of the terminal device more precisely and predict the application to be launched more accurately. The status feature information can include more features, which is not limited in the implementations of the present disclosure.

At block 102, the first status feature information is compared with a plurality of pre-collected samples of a sample set.

The plurality of pre-collected samples include second status feature information of the terminal device in a preset sampling period, and each sample of the plurality of pre-collected samples corresponds to a sample tag indicating a next application to be launched. The next application to be launched may include a next application to be started and a next application to be switched from the background to the foreground. The next application to be launched indicates that the user needs to use this application. The preset sampling period may indicate the duration of continuous sample collection. Samples are collected at a preset sampling frequency in the preset sampling period. The preset sampling period can be determined according to characteristics of the smart terminal, the usage requirement, and the like, which is not limited herein. For example, most users use the smart phone almost every day, and the preset sampling period can be set short, such as half a month. When the smart phone is of a relatively large usage intensity (such as being used for a long time per day), the preset sampling period can be set shorter, such as a week. The sampling frequency is not limited in the implementations of the present disclosure. As an implementation, the sampling frequency can be determined according to frequency or times of using applications. For example, the sampling frequency can be set to one time per 3 minutes (1 time/3 mins).

As an implementation, the plurality of pre-collected samples of the sample set can be stored in a server or in the terminal device. When plurality of pre-collected samples of the sample set is stored in the server, the server can send a sample collecting instruction to the terminal device according to a sampling plan, and the terminal device uploads corresponding data to the server according to the sample collecting instruction. When the plurality of pre-collected samples of the sample set is stored in the terminal device, the terminal device may not need to establish a connection with the server, that is, does not need to have network access function to ensure the timeliness and the accuracy of the process of collecting samples.

As an implementation, the method further includes the follows prior to the application-preloading-prediction event being detected to be triggered. Second status feature information of the terminal device in the preset sampling period is acquired as the plurality of pre-collected samples. Next applications to be launched are monitored and identified as the sample tags corresponding to the plurality of pre-collected samples.

In the process of collecting samples, after acquiring the second status feature information, running statuses of applications of the terminal device are monitored. Next applications opened by the user are recorded as the sample tags corresponding to the samples. For example, when the status feature information including time information 7:10 in the morning (or a time period from 7:00 am to 8:00 am) and the connection status of the wireless hotspot 'connected' is acquired, sample 1 is formed. Then, the user opens Application 1 at 7:15, and there are no other applications opened from 7:10 to 7:16. Application 1 is recorded as the sample tag corresponding to the sample 1. If sample 2 is collected at 7:13, the status feature information including time information "7:13 in the morning" and the connection status of the wireless hotspot "connected", the sample tag corresponding to the sample 2 is also Application 1. If sample 3 is collected at 7:16, the connection status of the wireless hotspot is "connected", and the user opens Application 2 at 7:17, then Application 2 is the sample tag corresponding to the sample 3.

For operations at block 102, the first status feature information of the terminal device can be compared with each sample of the sample set. In the process of comparison, the first status feature information is compared with features of the sample one by one. As an implementation, when the status feature information includes the time information and the connection status of the wireless hotspot, compare whether the connection status of the wireless hotspot in each sample is the same as the connection status in the first status feature information, and then compare the difference between the time information of each sample and the time information of the first status feature. For example, the current moment is 7:14 am, and the connection status of the wireless hotspot is connected, then the first status feature information and the sample 2 have 1 minute difference in time, and the first status feature information and the sample 3 have 2 minutes difference in the time.

At block 103, a target application to be launched is predicted according to a comparison result.

As an implementation, a sample closest to the first status feature information or relatively close to the first status feature information can be selected according to the comparison result. The target application can be determined according to the sample tags corresponding to the selected samples. As exemplified above, the first status feature information corresponding to the current moment and the sample 2 have 1 minute difference in the time information, and the first status feature information corresponding to the current moment and the sample 3 have 2 minutes difference in the time information, then the sample 2 is the closest sample, and the sample 3 is a relatively close sample. The Application 1 corresponding to the sample 2 can be determined as the target application, or both the Application 1 and the Application 2 can be determined as target applications.

As an implementation, k samples that are closest to the first status feature information can be selected according to a preset threshold k. Sample tags corresponding to the k samples are counted, and N applications most frequently indicated by the sample tags are determined as the target application(s) to be launched. In other words, K-nearest-neighbor (KNN) algorithm can be used to predict the target application to be launched. For example, when the preset threshold k=10, the sample tags corresponding to the ten samples can be further counted. It is assumed that five out of ten samples correspond to Application a; three out of ten samples correspond to Application b; one out of ten samples corresponds to Application c; one out of ten samples corresponds to Application d. When the N=1, Application a can be determined as the target application; when the N=2, Application a and Application b can be determined as the target applications.

At block 104, the target application is preloaded.

In the implementations of the present disclosure, the process of preloading and data resources preloaded are not limited herein. As an implementation, corresponding hardware resources can be allocated to the target application, and relevant data required for startup is preloaded based on the allocated hardware resources. In addition, the preloaded data resources can be determined according to a specific type of the target application. For example, when the target application is a social application, a splash screen, a contact list, and recent message records of the application can be preloaded. When the target application is a game, relevant data such as game background of the application can be preloaded.

After the target application is preloaded, if the user really wants to use the target application, the user may trigger to launch the target application (such as click the application icon corresponding to the target application). At this time, since all or part of resources for startup have been preloaded, launching speed of the target application can be significantly improved, and the user's waiting time can be reduced.

Understandably, when the target application is already in a running status (that is, the target application is running in a background), there is no need for preloading, and a new un-launched target application can be determined.

According to the technical solution for preloading an application, the first status feature information of the terminal device is acquired in response to an application-preloading-prediction event being detected to be triggered. Then, the first status feature information is compared with the plurality of pre-collected samples of the sample set, where the plurality of pre-collected samples include the status feature information of the terminal device in the preset sampling period, and each sample of the plurality of pre-collected samples corresponds to the sample tag indicating the next application to be launched. The status feature information includes at least one of the time information, the switch status of mobile data network, and the connection status of a wireless hotspot. Thereafter, the target application to be launched is predicted according to the comparison result and then preloaded. By means of the above technical solution, an application to be launched can be predicted according to current usage status of the terminal device, status recorded during history usage process, and habits of launching applications of the user, and then the application is preloaded. Therefore, the application to be launched can be predicted accurately, thus improving launching speed of the application under the precondition of saving storage space.

As an implementation, when detecting that the application-preloading-prediction event is triggered, the first status feature information of the terminal device can be acquired as follows.

Remaining storage space of the terminal device is acquired in response to the application-preloading-prediction event being detected to be triggered. Whether the remaining storage space reaches a preset storage threshold is judged. When the remaining storage space reaches the preset storage threshold, the first status feature information is acquired. In this way, it can be avoided that when the storage space of the terminal device is insufficient and the application is preloaded, preloaded resources may occupy a certain storage space and affect an overall operation of the terminal device. Therefore, the subsequent operations can be omitted when the remaining storage space does not reach the preset storage threshold, thereby saving system resource.

As an implementation, the status feature information further includes at least one of identity information of a connected wireless hotspot, a current running application, a previous foreground application, a date category, plugging and unplugging status of a headphone jack, charging status, power information of a battery, display duration of a screen, motion status of the terminal device, and location information of the terminal device. In this way, dimensions and layers of the divided status of the terminal device can be enriched, thereby application to be launched predicted more accurately.

When the terminal device is connected to the wireless hotspot, the identity information of the connected wireless hotspot can be further acquired. The identity information can be an identity identifier. Taking WiFi as an example, the identity information can be a service set identifier (SSID) or a basic service set identifier (BSSID). The terminal device may connect to different wireless hotspots, which may indicate that the user is in different environment, such as at home, in the office, or in a public area. In addition, different wireless hotspots may also be divided into public hotspots and personal hotspots, as well as encrypted hotspots and unencrypted hotspots. Due to considerations such as usage occasion and security, users may use different applications when the terminal device connects to different wireless hotspots, so the identity information of the connected wireless hotspots can be used as a feature of the sample.

In the process of using the terminal device, the launching sequences of two or more applications may have a relation. For example, when the user uses Application 1, she or he may use applications such as Application 2, Application 3 and the like for comparison of a product's price. In this implementation, Application 1, Application 2 and Application 3 belong to the same type of applications, such as shopping applications. Therefore, the current running application may have an impact on an application to be launched. The current running application can include at least one of a foreground running application and a background running application. In the implementations of the present disclosure, the current running application can be used as a feature of the sample.

As mentioned above, the launching sequences of two or more applications may have a relation. A previous foreground application (running in a foreground) may have an impact on an application to be launched. In the implementations of the present disclosure, the previous foreground application can be used as a feature of the sample.

As an implementation, the date category may include weekdays and days off work. The days off work can include weekends, statutory holidays, or vacation holidays in schedule information. In different types of dates, users may generally do quite different things, and applications opened by the user may be generally different. Therefore, the date category can also be included as a feature of the collected samples.

The terminal device is usually equipped with a headphone jack, and the user can determine whether to listen to sound of the terminal device through headphones according to usage environment or requirement of listening experience. In general, when the plugging and unplugging status of the headphone jack is plugged in, multi-media player-like applications may be used; when the plugging and unplugging status of the headphone jack is not plugged in and the terminal device is in a public place, the multi-media player-like applications may not be used and some applications that play less sound will be chose for use. Considering the above factors, the plugging and unplugging status of the headphone jack can be used as a feature of the sample.

Mobile attribute of the terminal device determines that a battery is required to supply power. When the charging status of the terminal device is charging, it may have a certain impact on the use of the terminal device. Generally, the user may not use the terminal device, so applications which are started now are generally more demanded applications. When the charging status of the terminal device is not charging, the applications used may be unrestricted. Therefore, the charging status can be used as a feature of the sample.

The charging status can include charging and not-charging. When the terminal device is charging, the charging status can also include a charging mode. The charging mode may include a fast charging mode and a normal charging mode. The fast charging mode may indicate that the terminal device is charged though a fast charging power adapter (such as a portable power source), and the normal charging mode may indicate that the mobile is charged though a normal charging power adapter (such as an original charger of the terminal device).

When the power of the terminal device is insufficient, in order to extend standby time, the user may not open an application that consumes a large amount of power, such as a video player. When the power of the terminal device is sufficient, applications to be used may not be restricted. Therefore, the power information of the battery can be used as a feature of the sample.

The display duration of the screen may refer to a time length when the terminal device remains displayed after being lit up. The display duration of the screen may be configured to indicate accumulative duration of the continuous usage of the terminal device. After different usage accumulative durations, the next application that the user may choose to open may also be different. For example, when the display duration of the screen reaches an hour, the user may need to rest his or her eyes, and a music player may be turned on. In the implementations of the present disclosure, the display duration of the screen can be used as a feature of the sample.

The motion status of the terminal device may reflect a usage scenario of the terminal device to some extent. In different motion status such as in a running scenario, a driving scenario, a walking scenario, a stationary scenario, and the like, the user may have different usage requirements for applications. For example, the user may need to use a music player to listen to songs while running, need to use a navigation application to navigate while driving, and so on. In addition, the stationary status may also include a posture of the terminal device, such as a tilt angle, etc., which may reflect the status when the user uses the terminal device, such as using at a desktop, using in bed, and the like. In the implementations of the present disclosure, the motion status of the terminal device can be used as a feature of the sample.

The location information of the terminal device may reflect usage environment of the terminal device to some extent, such as indoors or outdoors, in the office or at home, in a shopping mall, a theater or a tourist attraction, and the like. The user may choose to use different applications at different locations. In the implementations of the present disclosure, the location information of the terminal device can be used as a feature of the sample.

It should be noted that, each of features of the sample is exemplified in order to illustrate that different values of any feature may have an effect on the prediction result. However, the above examples will not limit the implementations of the present disclosure. When the number of features in the sample is larger, the more accurate the prediction result is. The feature can be selected according to actual situation, and is not limited to the above-listed features.

As an implementation, after the terminal device acquired the first status feature information and the second status feature information, the terminal device normalizes the first status feature information and the second status feature information to obtain normalized real numbers. In this way, the information of the first status feature information and the second status feature information is real numbers, such as normalized real numbers. Values of the features in the sample can be normalized to obtain normalized real numbers, such as normalized to obtain real numbers between 0 and 1, which makes it possible to facilitate the comparison of values of the features and related calculations, thereby reducing calculation amount. For example, convert value corresponding to each feature into a corresponding serial number, such as converting the WiFi SSID "abcd" to NO. 1, converting the WiFi SSID "xyz" to NO. 2, and the like, and then perform normalization. Since different features are located in different positions in the sample, serial numbers of different features can be different, or can be multiplexed (for example, the numbers corresponding to both the charging status and the power information of the battery can be NO. 1). Further, the application names in the sample tags can also be converted into a number, such as converting the name of Application 1 into NO. 1, converting the name of Application 2 into NO. 2, and the like, and then perform normalization.

As an implementation, the target application to be launched is predicted according to the comparison result as follows. The comparison result is processed according to a KNN algorithm and the target application to be launched is predicted according to a processing result. In this way, the algorithm is simple and accurate, so that the target application to be launched can be determined quickly and accurately.

As an implementation, the first status feature information is compared with the plurality of pre-collected samples of the sample set as follows. For each pre-collected sample of the sample set, a distance between the first status feature information and the sample is calculated through a preset algorithm, and a plurality of distances are obtained.

The comparison result is processed according to the KNN algorithm and the target application to be launched is predicted according to the processing result as follows.

k minimum distances are selected from the plurality of distances. Sample tags corresponding to the k distances are acquired. N applications most frequently indicated by the sample tags are determined as the target application to be launched. In this way, the sample tags are selected according to the distances thereby improving the accuracy of a calculation result. As an implementation, K minimum distances are selected from the plurality of distances as follows. All calculated distances are sorted in an ascending order, the first k distances are selected as the k minimum distances, and the k can be a positive integer greater than or equal to one.

As an implementation, the N applications most frequently indicated by the sample tags are determined as the target application to be launched as follows. Applications indicated by the sample tags can be sorted in a descending order according to the number of occurrences, and the top-ranking N applications are determined as the target application to be launched, and N can be a positive integer greater than or equal to one.

The preset algorithm may be any algorithm for calculating distances, such as the Euclidean distance calculation algorithm or the Mahalanobis distance calculation algorithm, etc., which is not limited in the implementations of the present disclosure.

As an implementation, N applications most frequently indicated by the sample tags are determined as the target application to be launched as following.

Storage space information of the terminal device is acquired and the value of N is determined according to the storage space information. The N applications most frequently indicated by the sample tags are determined as the target application to be launched. In this way, the number of pre-loaded applications can be determined according to the size of the current remaining storage space of the terminal device. When there is more remaining storage space, multiple applications can be chosen to be pre-loaded to improve the hit rate of the prediction result. When there is less remaining storage space, one application can be chosen to be pre-loaded to save storage space and ensure the smooth running of the terminal device as a whole. The correspondence between sizes of the storage space and N can be set in advance and stored in the terminal device.

As an implementation, the process of sample collection can be performed in parallel with the prediction process of application preloading. Old parts in the sample set can be deleted periodically, and only the samples in a latest preset sampling period are retained to reflect latest usage habits, to reduce the calculation amount of prediction operation, and to save storage space occupied by the sample set.

Figure 2:
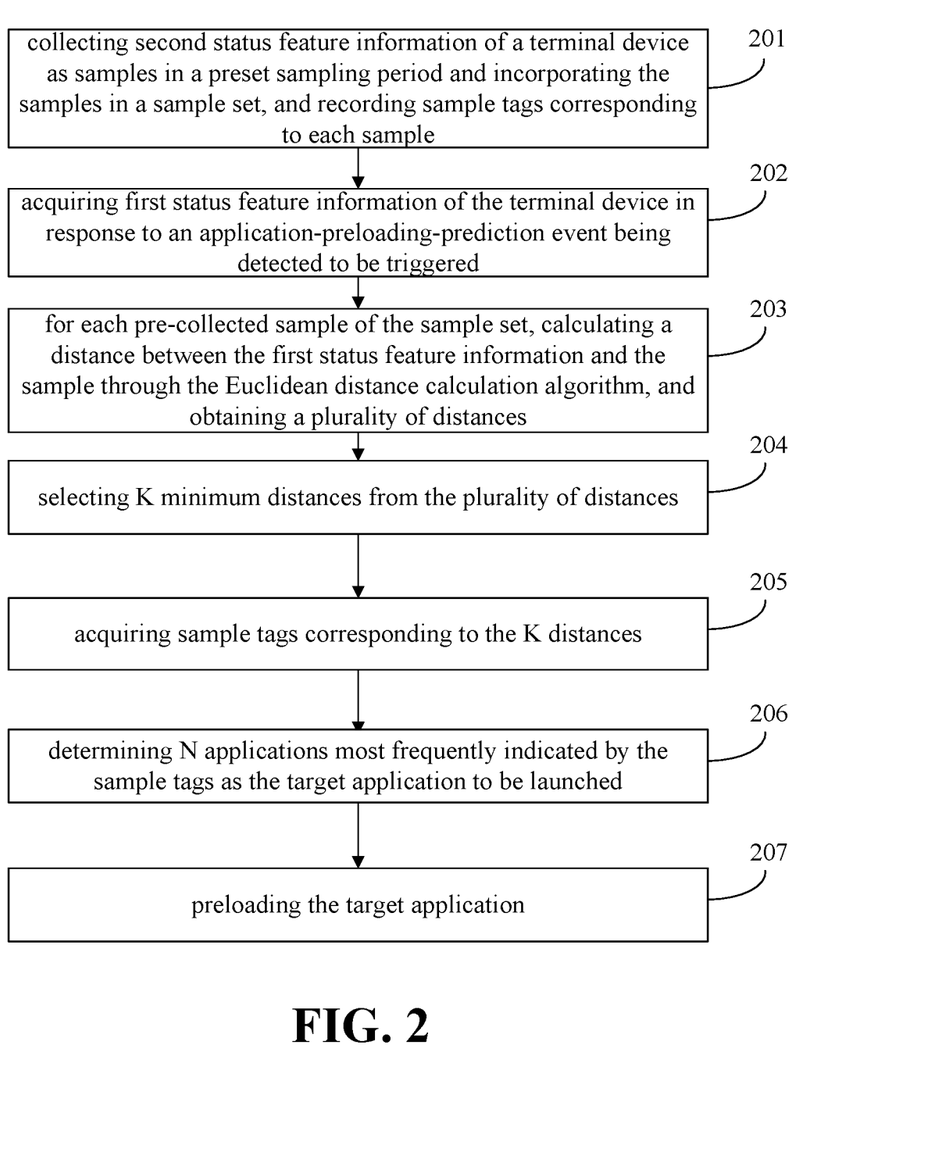
FIG. 2 is a schematic flow chart illustrating another method for preloading an application according to an implementation of the present disclosure.

FIG. 2 is a schematic flow chart illustrating another method for preloading an application according to an implementation of the present disclosure. As illustrated in FIG. 2, the method begins at block 201.

At block 201, second status feature information of a terminal device are collected as samples in a preset sampling period and incorporated in a sample set, and sample tags corresponding to each sample is recorded.

As an implementation, features of the sample include at least one of time information, switch status of mobile data network, connection status of a wireless hotspot, identity information of a connected wireless hotspot, a current running application, a previous foreground application, date category, plugging and unplugging status of a headphone jack, charging status, and power information of a battery.

As for a sample, the values corresponding to different collected features constitute a feature set of the sample. The feature set is recorded by a set of real numbers. Both the values of features and the sample tags are converted into corresponding serial numbers, and then normalized, so that the samples and the corresponding sample tags can be recorded as $(x_1, x_2, \ldots, x_n, y)$. $x_1, x_2, \ldots,$ and $x_n$ represent respectively n feature values, which are normalized real numbers (normalized to real numbers from 0 to 1). $x_1, x_2, \ldots,$ and $x_n$ can be regarded as a vector for representing a status feature. y refers to a sample tag, which is also a normalized real number. Sample data is continuously collected for one week to obtain a sample set, that is, a sample database, and then prediction of preloaded application can be performed based on the sample database.

At block 202, first status feature information of the terminal device is acquired in response to an application-preloading-prediction event being detected to be triggered.

As an implementation, the first status feature information can be represented as a status feature vector, $x_1^0, x_2^0, \ldots, x_n^0$. Items contained in the first status feature information correspond to the features contained in the sample.

At block 203, for each pre-collected sample of the sample set, a distance between the first status feature information and the sample is calculated through the Euclidean distance calculation algorithm, and a plurality of distances are obtained.

As an implementation, all sample data is selected from the sample set, and then compared with the first status feature information. For a vector i, $(x_1, x_2, \ldots, x_n, y)$ corresponding to each sample, a Euclidean distance $y^i$ between the first status feature information and the sample is calculated through the following formula.

$$y^i = \sqrt{(x_1 - x_1^0)^2 + (x_2 - x_2^0)^2 + \ldots + (x_n - x_n^0)^2}$$

At block 204, k minimum distances are selected from the plurality of distances.

As an implementation, the $y^i$ obtained are sorted in an ascending order, and then first k distances are selected. k can be a preset constant. For example, k=9.

At block 205, sample tags corresponding to the k distances are acquired.

At block 206, applications most frequently indicated by the sample tags are determined as the target application to be launched.

As an implementation, the sample tags (classification tags) of the samples corresponding to the k distances are counted, and a class of application with the largest number of samples in the classification is used as the prediction result. For example, among nine samples, four samples are marked as application A, three samples are marked as application B, one sample is marked as application C, and one sample is marked as application D, and the prediction result is application A.

At block 207, the target application is preloaded.

As an implementation, in case of sufficient memory, data corresponding to application A is loaded into the memory in advance.

As for the method for preloading an application provided by the implementations of the present disclosure, the sample includes data with a plurality of dimensions, which can comprehensively reflect the usage habits, predict quickly and accurately the next application to be used by the user based on the KNN algorithm, and preload the application in advance, thereby improving launching speed of the application under the precondition of saving storage space.

Figure 3:
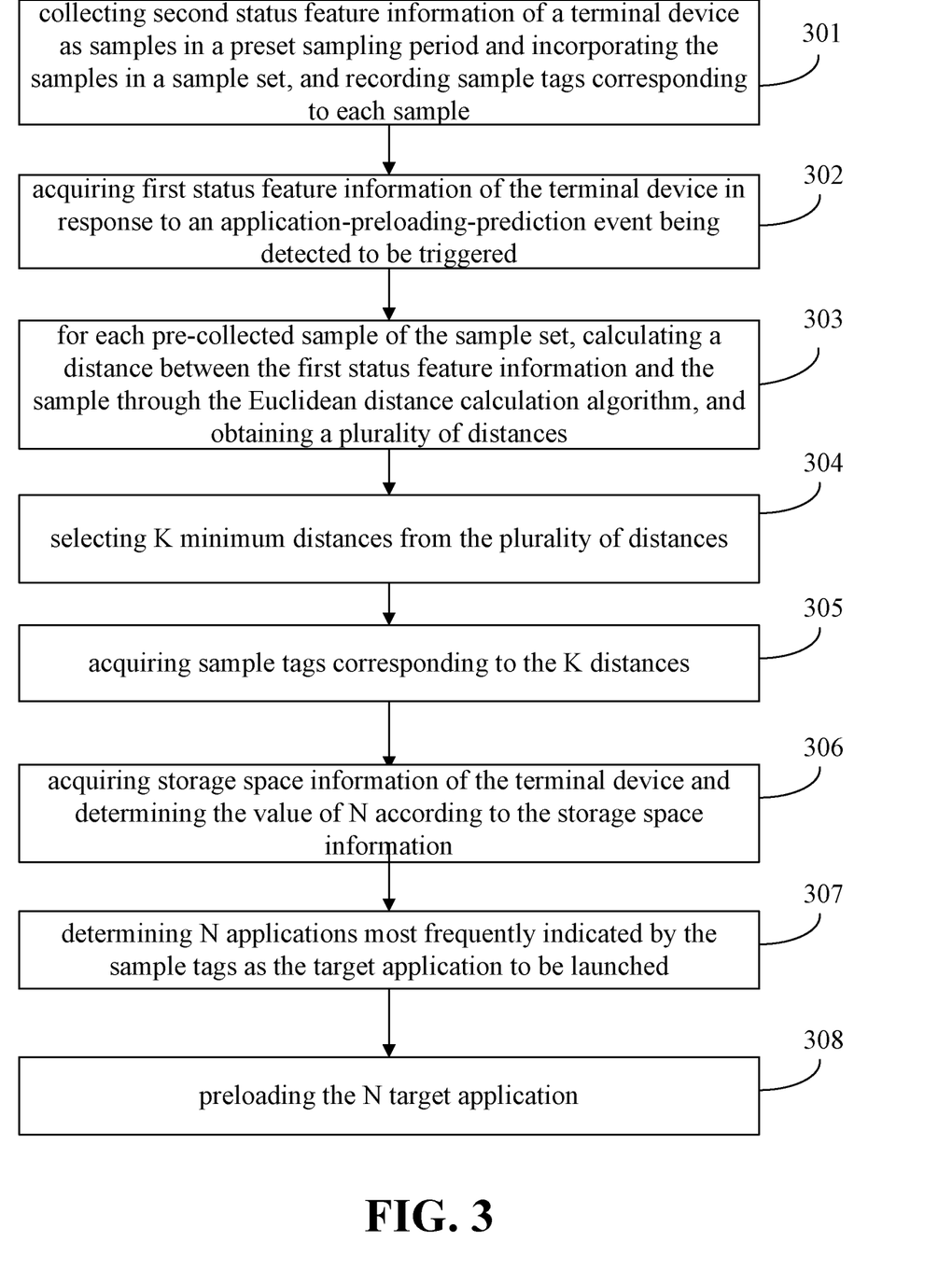
FIG. 3 is a schematic flow chart illustrating another method for preloading an application according to an implementation of the present disclosure.

FIG. 3 is a schematic flow chart illustrating another method for preloading an application according to an implementation of the present disclosure. As illustrated in FIG. 3, the method begins at block 301.

At block 301, second status feature information of a terminal device are collected as samples in a preset sampling period and incorporated in a sample set, and sample tags corresponding to each sample is recorded.

As an implementation, features of the sample include at least one of the following time information, switch status of mobile data network, connection status of a wireless hotspot, identity information of a connected wireless hotspot, a current running application, a previous foreground application, date category, plugging and unplugging status of a headphone jack, charging status, power information of a battery, display duration of a screen, motion status of the terminal device, and location information of the terminal device.

At block 302, first status feature information of the terminal device is acquired in response to an application-preloading-prediction event being detected to be triggered.

At block 303, for each pre-collected sample of the sample set, a distance between the first status feature information and the sample is calculated through the Euclidean distance calculation algorithm, and a plurality of distances are obtained.

At block 304, k minimum distances are selected from the plurality of distances.

At block 305, sample tags corresponding to the k distances are acquired.

At block 306, storage space information of the terminal device is acquired and the value of N is determined according to the storage space information.

As an implementation, the storage space information can refer to remaining memory. Performance of the terminal device can be tested in advance by simulation or experiment when different numbers of applications are loaded in different remaining memory statuses, thereby determining the value of N corresponding to different storage space information, and storing the correspondence in the terminal device.

In addition, for different applications, pre-loaded resources may occupy storage space of different sizes. The total amount of the storage space to be occupied by the pre-loadable resources can be determined according to the current storage space information. The applications are sorted in a descending order according to the number of occurrences in the sample tag, the total number of applications that can be preloaded is determined according to the total amount, and the total number is determined as the value of N.

At block 307, N applications most frequently indicated by the sample tags are determined as the target application to be launched.

At block 308, the N target applications are preloaded.

As for the method for preloading an application provided by the implementations of the present disclosure, the sample includes data with a plurality of dimensions, which can comprehensively reflect the usage habits, predict quickly and accurately the next application to be used by at least one user based on the KNN algorithm and the storage space information of the terminal device, and preload the application in advance, thereby increasing the hit rate of prediction result and the improving launching speed of the application.

Figure 4:
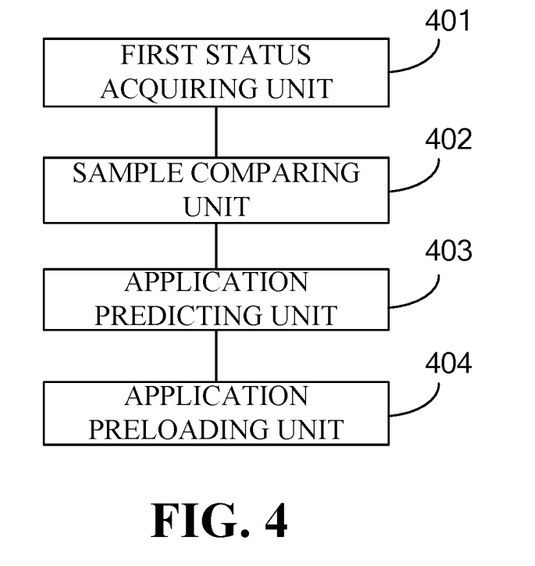
FIG. 4 is a schematic structural diagram illustrating an apparatus for preloading an application according to an implementation of the present disclosure.

FIG. 4 is a schematic structural diagram illustrating an apparatus for preloading an application according to an implementation of the disclosure. The apparatus can be implemented with software and/or hardware and can be generally integrated in a terminal device. The device can preload an application to be launched by executing the method for preloading the application. As illustrated in FIG. 4, the apparatus includes a first status acquiring unit 401, a sample comparing unit 402, an application predicting unit 403, and an application preloading unit 404.

The first status acquiring unit 401 is configured to acquire first status feature information of a terminal device in response to an application-preloading-prediction event being detected to be triggered.

The sample comparing unit 402 is configured to compare the first status feature information with a plurality of pre-collected samples of a sample set. The plurality of pre-collected samples include second status feature information of the terminal device in a preset sampling period, and each sample of the plurality of pre-collected samples corresponding to a sample tag indicates a next application to be launched.

The application predicting unit 403 is configured to predict a target application to be launched according to a comparison result.

The application preloading unit 404 is configured to preload the target application.

According to the apparatus for preloading an application provided in the implementations of the present disclosure, the first status feature information of the terminal device is acquired in response to the application-preloading-prediction event being detected to be triggered. Then, the first status feature information is compared with the plurality of pre-collected samples of the sample set, where the plurality of pre-collected samples include the status feature information of the terminal device in the preset sampling period, and each sample of the plurality of pre-collected samples corresponds to the sample tag indicating the next application to be launched. The status feature information includes at least one of the time information, the switch status of mobile data network, and the connection status of a wireless hotspot. Thereafter, the target application to be launched is predicted according to the comparison result and then preloaded. By means of the above technical solution, an application to be launched can be predicted according to current usage status of the terminal device, status recorded during history usage process, and habits of launching applications of the user, and then the application is preloaded, therefore the application to be launched can be predicted accurately, thus improving launching speed of the application under the precondition of saving storage space.

As an implementation, the apparatus further includes a sample collecting unit and a sample tags recording unit.

The sample collecting unit is configured to acquire second status feature information of the terminal device in the preset sampling period as the plurality of pre-collected samples, prior to detecting that the application-preloading-prediction event is triggered.

The sample tags recording unit is configured to monitor next applications to be launched and identify them as the sample tags corresponding to the plurality of pre-collected samples.

As an implementation, the status feature information is normalized real numbers.

As an implementation, the application predicting unit 403 is configured to process the comparison result according to a KNN algorithm and predicting the target application to be launched according to a processing result.

As an implementation, the first status acquiring unit 401 is configured to calculate a distance between the first status feature information and the sample through a preset algorithm for each pre-collected sample of the sample set, and obtain a plurality of distances.

The application predicting unit 403 configured to process the comparison result according to the KNN algorithm and predicting the target application to be launched according to a processing result is configured to: select K minimum distances from the plurality of distances; acquire sample tags corresponding to the K distances; determine N applications most frequently indicated by the sample tags as the target application to be launched.

As an implementation, the application predicting unit 403 configured to determine the N applications most frequently indicated by the sample tags as the target application to be launched is further configured to: acquire storage space information of the terminal device and determining the value of N according to the storage space information; determine the N applications most frequently indicated by the sample tags as the target application to be launched.

As an implementation, the status feature information includes at least one of the following: time information, date category, switch status of mobile data network, connection status of a wireless hotspot, identity information of a connected wireless hotspot, a current running application, a previous foreground application, plugging and unplugging status of a headphone jack, charging status, power information of a battery, display duration of a screen, motion status of the terminal device, and location information of the terminal device.

It is to be noted that, the apparatus described in the apparatus implementations of the disclosure is presented in the form of functional units. The term "unit" used herein should be understood as the broadest meaning as possible, and an object for implementing functions defined by each "unit" may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

Implementations of the disclosure also provide a non-transitory computer readable storage medium. The non-transitory computer readable storage medium includes computer executable instructions, and the computer executable instructions are used for executing a method for preloading an application when executed by a computer processor. The method includes the following.

First status feature information of a terminal device is acquired in response to an application-preloading-prediction event being detected to be triggered. The first status feature information is compared with a plurality of pre-collected samples of a sample set. The plurality of pre-collected samples include second status feature information of the terminal device in a preset sampling period, and each sample of the plurality of pre-collected samples corresponds to a sample tag indicating a next application to be launched. A target application to be launched is predicted according to a comparison result. The target application is preloaded.

The non-transitory computer readable storage medium refers to any of various types of memory devices or storage devices. The term "storage medium" is intended to include: a mounting medium such as a compact disc read-only memory (CD-ROM), a floppy disk, or a tape device; a computer system memory or a random access memory such as a dynamic random access memory (DRAM), a display data random access memory (DDRRAM), a static random access memory (SRAM), an extended data output random access memory (EDORAM), and a Rambus random access memory (Rambus RAM); a non-transitory memory such as a flash memory and a magnetic medium (such as a hard disk or an optical memory); a register and other similar types of memory element, and the like. The non-transitory computer readable storage medium may also include other types of memory or a combination thereof. In addition, the non-transitory computer readable storage medium may be located in a first computer system in which a program is executed, or may be located in a second computer system coupled to the first computer system via a network, such as the Internet. The second computer system can provide program instructions to the first computer for execution. The term "non-transitory computer readable storage medium" can include two or more storage media that may reside in different locations (e.g., different computer systems connected through a network). The non-transitory computer readable storage medium may store program instructions (e.g., computer programs) executable by one or more processors.

Implementations of the disclosure provide a non-transitory computer readable storage medium including computer executable instructions. The computer executable instructions contained in the non-transitory computer readable storage medium are not limited to executing the operations of preloading the application as described above, and can also execute relevant operations of the method for preloading the application according to the implementations of the disclosure.

Figure 5:
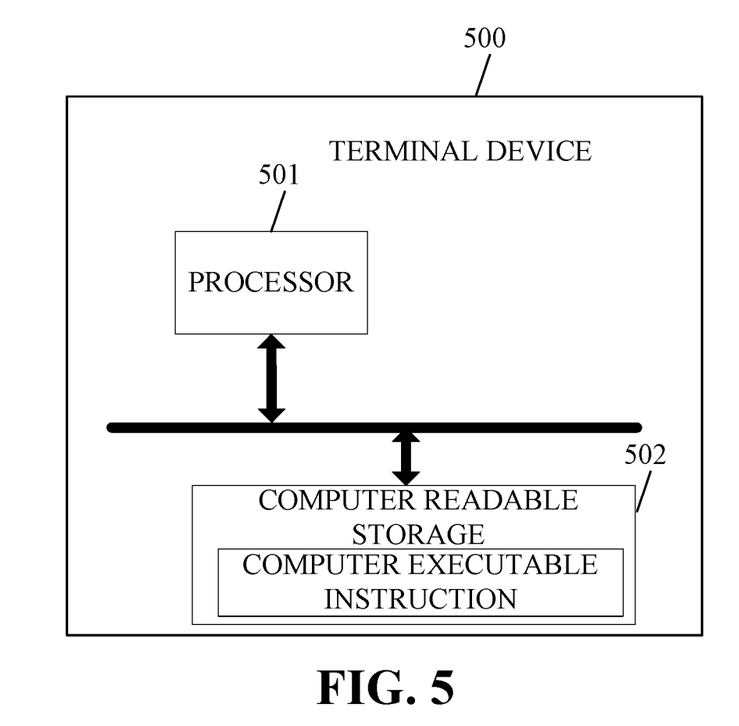
FIG. 5 is a schematic structural diagram illustrating a terminal device according to an implementation of the present disclosure.

Implementations of the disclosure provide a terminal device. The device for preloading the application of the implementations of the disclosure can be integrated into the terminal. FIG. 5 is a schematic structural diagram illustrating a terminal device according to an implementation of the disclosure. A terminal device 500 includes at least one processor 501 and a computer readable storage 502, coupled to the at least one processor 501 and storing at least one COMPUTER EXECUTABLE INSTRUCTION thereon which, when executed by the at least one processor, causes the at least one processor 501 to carry out the following actions.

First status feature information of a terminal device is acquired in response to an application-preloading-prediction event being detected to be triggered. The first status feature information is compared with a plurality of pre-collected samples of a sample set. The plurality of pre-collected samples include second status feature information of the terminal device in a preset sampling period, and each sample of the plurality of pre-collected samples corresponds to a sample tag indicating a next application to be launched. A target application to be launched is predicted according to a comparison result. The target application is preloaded.

As an implementation, the at least one processor 501 is further configured to acquire remaining storage space of the terminal device in response to the application-preloading-prediction event being detected to be triggered, and acquire the first status feature information of a terminal device when the remaining storage space reaches a preset storage threshold.

As an implementation, the at least one processor 501 is further configured to acquire the second status feature information of the terminal device in the preset sampling period as the plurality of pre-collected samples, and monitor next applications to be launched and identifying them as the sample tags corresponding to the plurality of pre-collected samples.

As an implementation, the at least one processor 501 is further configured to normalize the first status feature information and the second status feature information to obtain normalized real numbers.

As an implementation, the at least one processor 501 configured to carry out the predicting a target application to be launched according to a comparison result is configured to process the comparison result according to a KNN algorithm and predicting the target application to be launched according to a processing result.

As an implementation, the at least one processor 501 configured to carry out the comparing the first status feature information with a plurality of pre-collected samples of a sample set is configured to calculate a distance between the first status feature information and the sample through a preset algorithm for each pre-collected sample of the sample set, and obtain a plurality of distances.

The at least one processor 501 configured to carry out the processing the comparison result according to a KNN algorithm and predicting the target application to be launched according to a processing result is configured to select K minimum distances from the plurality of distances, to acquire sample tags corresponding to the K distances, and to determine N applications most frequently indicated by the sample tags as the target application to be launched.

As an implementation, the at least one processor 501 configured to carry out the determining N applications most frequently indicated by the sample tags as the target application to be launched is configured to acquire storage space information of the terminal device and determining the value of N according to the storage space information, and to determine the N applications most frequently indicated by the sample tags as the target application to be launched.

As an implementation, the status feature information comprises at least one of the following: time information, date category, switch status of mobile data network, connection status of a wireless hotspot, identity information of a connected wireless hotspot, a current running application, a previous foreground application, plugging and unplugging status of a headphone jack, charging status, power information of a battery, display duration of a screen, motion status of the terminal device, and location information of the terminal device.

According to the terminal device of the implementations of the disclosure, an application to be launched can be predicted according to current usage status of the terminal device, status recorded during user history usage process, and habits of launching applications, and then the application is preloaded. In this way, the application to be launched can be predicted accurately, thus improving launching speed of the application under the precondition of saving storage space.

Figure 6:
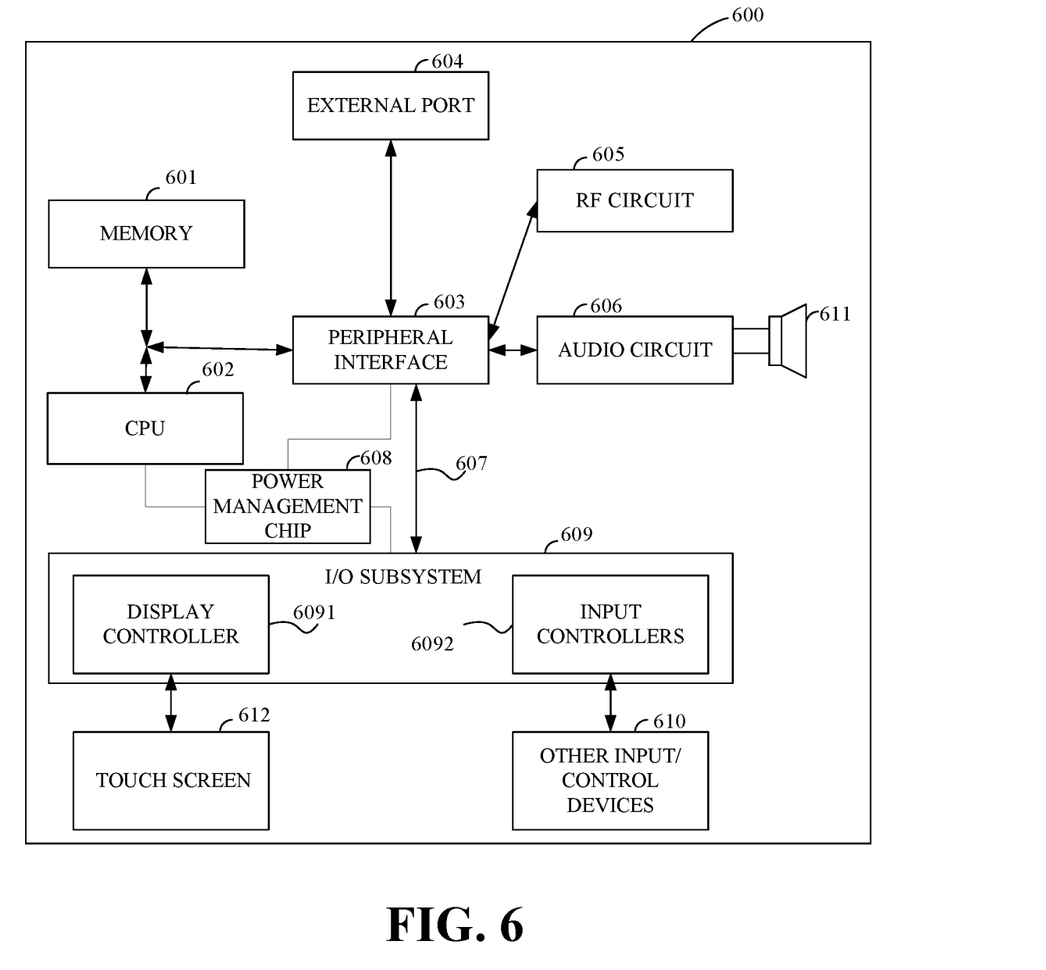
FIG. 6 is a schematic structural diagram illustrating another terminal device according to an implementation of the present disclosure.

FIG. 6 is a schematic structural diagram illustrating another terminal device according to an implementation of the disclosure. As illustrated in FIG. 6, the terminal includes a housing (not illustrated), a memory 601, and a central processing unit (CPU) 602 (also referred to as a processor, hereinafter as CPU for short), a circuit board (not illustrated), and a power supply circuit (not illustrated). The circuit board is disposed inside a space defined by the housing. The CPU 602 and the memory 601 are disposed on the circuit board. The power supply circuit is configured to supply power to each circuit or component of the terminal. The memory 601 is configured to store executable program codes. The CPU 602 is configured to run a computer program corresponding to the executable program codes by reading the executable program codes stored in the memory 601 to carry out the following operations.

First status feature information of a terminal device is acquired in response to an application-preloading-prediction event being detected to be triggered. The first status feature information is compared with a plurality of pre-collected samples of a sample set. The plurality of pre-collected samples include second status feature information of the terminal device in a preset sampling period, and each sample of the plurality of pre-collected samples corresponds to a sample tag indicating a next application to be launched. A target application to be launched is predicted according to a comparison result. The target application is preloaded.

The terminal further includes a peripheral interface 603, a radio frequency (RF) circuit 605, an audio circuit 606, a speaker 611, a power management chip 608, an input/output (I/O) subsystem 609, other input/control devices 610, a touch screen 612, and an external port 604, which are communicated via one or more communication buses or signal lines 607.

It should be understood that, the terminal 600 illustrated is exemplary and the terminal 600 may have more or fewer components than those illustrated in FIG. 7. For example, two or more components may be combined, or different component configurations can be adopted in the terminal. The various components illustrated in FIG. 7 can be implemented in hardware, software, or a combination of hardware and software including one or more signal processing and/or application specific integrated circuits.

The following describes a mobile phone as an example of a terminal device for preloading an application.

The memory 601 can be configured to be accessed by the CPU 602, the peripheral interface 603 and so on. The memory 601 may include a high-speed random-access memory and may further include a non-transitory memory such as one or more magnetic disk storage devices, flash memory devices, or other transitory solid-state memory devices.

The peripheral interface 603 is configured to connect the input and output peripherals of the device to the CPU 602 and the memory 601.

The I/O subsystem 609 can be configured to connect the input and the output peripherals, such as connecting the touch screen 612 and other input/control devices 610 to the peripheral interface 603. The I/O subsystem 609 may include a display controller 6091 and one or more input controllers 6092 configured to control other input/control devices 610. The one or more input controllers 6092 are configured to receive electrical signals from or send electrical signals to other input/control devices 610, where other input/control devices 610 may include a physical button (a press button, a rocker button, etc.), a dial, a slide switch, a joystick, or a click wheel. It should be noted that the input controller 6092 can be coupled with any of a keyboard, an infrared port, a universal serial bus (USB) interface, and a pointing apparatus such as a mouse.

The touch screen 612 functions as an input interface and an output interface between a terminal and a user, and is configured to display a visual output to the user. The visual output may include graphics, text, icons, videos, and the like.

The display controller 6091 in the I/O subsystem 609 is configured to receive an electrical signal from or send an electrical signal to the touch screen 612. The touch screen 612 is configured to detect contact on the touch screen. The display controller 6091 is configured to convert the detected contact into an interaction with a user interface object displayed on the touch screen 612, that is, to realize human-computer interaction. The user interface object displayed on the touch screen 612 may be an icon of a running game, an icon indicating connection to corresponding networks, and the like. It should be noted that, the device may also include a light mouse, which is a touch sensitive surface that does not display a visual output, or can be an extension of a touch sensitive surface formed by the touch screen.

The RF circuit 605 is configured to establish communication between a mobile phone and the wireless network (i.e., network side) and to transmit and receive data between the mobile phone and the wireless network, for example, to transmit and receive short messages, emails, and the like. The RF circuit 605 is configured to receive and transmit RF signals (also known as electromagnetic signals), to convert an electrical signal into an electromagnetic signal or convert an electromagnetic signal into an electrical signal, and to communicate with a communication network and other devices through electromagnetic signals. The RF circuit may include known circuits for performing these functions, including but not limited to an antenna system, an RF transceiver, one or more amplifiers, a tuner, one or more oscillators, a digital signal processor, a coder-decoder (CODEC) chipset, a subscriber identity module (SIM) and so on.

The audio circuit 606 is configured to receive audio data from the peripheral interface 603, to convert the audio data into an electric signal, and to transmit the electric signal to the speaker 611.

The speaker 611 is configured to restore the voice signal received by the mobile phone from the wireless network via the RF circuit 605 to sound and to play the sound to the user.

The power management chip 608 is configured for power supply and power management of the hardware connected to the CPU 602, the I/O subsystem 609, and the peripheral interfaces 603.

The apparatus for preloading the application, the non-transitory computer readable storage medium, and the terminal of the above implementations have corresponding functional modules to execute the corresponding method for preloading the application and advantageous effects of executing the method. For technical details not described herein, reference may be made to the description of the method for preloading the application.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for preloading an application, comprising:
acquiring first status feature information of a terminal device in response to an application-preloading-prediction event being detected to be triggered;
comparing the first status feature information with a plurality of pre-collected samples of a sample set, the plurality of pre-collected samples comprising second status feature information of the terminal device in a preset sampling period, and each sample of the plurality of pre-collected samples corresponding to a sample tag indicating a next application to be launched;
predicting a target application to be launched according to a comparison result; and preloading the target application;
wherein predicting the target application to be launched according to the comparison result comprises: processing the comparison result according to a K-nearest-neighbor (KNN) algorithm and predicting the target application to be launched according to a processing result;
wherein comparing the first status feature information with the plurality of pre-collected samples of the sample set comprises: for each pre-collected sample of the sample set, calculating a distance between the first status feature information and the sample through a preset algorithm, and obtaining a plurality of distances; and wherein processing the comparison result according to the KNN algorithm and predicting the target application to be launched according to the processing result comprises: selecting K minimum distances from the plurality of distances; acquiring sample tags corresponding to the K minimum distances; and determining N applications most frequently indicated by the sample tags as the target application to be launched.

2. The method of claim 1, further comprising: prior to the acquiring first status feature information of the terminal device in response to the application-preloading-prediction event being detected to be triggered: acquiring remaining storage space of the terminal device in response to the application-preloading-prediction event being detected to be triggered; and proceeding to the acquiring first status feature information of a terminal device when the remaining storage space reaches a preset storage threshold.

3. The method of claim 1, further comprising: prior to detecting that the application-preloading-prediction event is triggered: acquiring the second status feature information of the terminal device in the preset sampling period as the plurality of pre-collected samples; and monitoring next applications to be launched and identifying them as the sample tags corresponding to the plurality of pre-collected samples.

4. The method of claim 3, further comprising: normalizing the first status feature information and the second status feature information to obtain normalized real numbers.

5. The method of claim 1, wherein determining the N applications most frequently indicated by the sample tags as the target application to be launched comprises: acquiring storage space information of the terminal device and determining the value of N according to the storage space information; and determining the N applications most frequently indicated by the sample tags as the target application to be launched.

6. The method of claim 1, wherein the first status feature information comprises at least one of: time information, date category, switch status of mobile data network, connection status of a wireless hotspot, identity information of a connected wireless hotspot, a current running application, a previous foreground application, plugging and unplugging status of a headphone jack, charging status, power information of a battery, display duration of a screen, motion status of the terminal device, and location information of the terminal device.

7. A terminal device, comprising:
at least one processor;
and a computer readable storage, coupled to the at least one processor and storing at least one computer executable instruction thereon which, when executed by the at least one processor, causes the at least one processor to: acquire first status feature information of a terminal device in response to an application-preloading-prediction event being detected to be triggered; compare the first status feature information with a plurality of pre-collected samples of a sample set, the plurality of pre-collected samples comprising second status feature information of the terminal device in a preset sampling period, and each sample of the plurality of pre-collected samples corresponding to a sample tag indicating a next application to be launched; predict a target application to be launched according to a comparison result; and preload the target application;
wherein the at least one processor configured to predict the target application to be launched according to the comparison result is configured to: process the comparison result according to a K-nearest-neighbor (KNN) algorithm and predict the target application to be launched according to a processing result;
wherein the at least one processor configured to compare the first status feature information with the plurality of pre-collected samples of the sample set is configured to: for each pre-collected sample of the sample set, calculate a distance between the first status feature information and the sample through a preset algorithm, and obtaining a plurality of distances; wherein the at least one processor configured to process the comparison result according to the KNN algorithm and predict the target application to be launched according to the processing result is configured to: select K minimum distances from the plurality of distances; acquire sample tags corresponding to the K minimum distances; and determine N applications most frequently indicated by the sample tags as the target application to be launched.

8. The terminal device of claim 7, wherein the at least one processor is further configured to: acquire remaining storage space of the terminal device in response to the application-preloading-prediction event being detected to be triggered; and proceed to the acquiring the first status feature information of the terminal device when the remaining storage space reaches a preset storage threshold.

9. The terminal device of claim 7, wherein the at least one processor is further configured to: acquire the second status feature information of the terminal device in the preset sampling period as the plurality of pre-collected samples; and monitor next applications to be launched and identifying them as the sample tags corresponding to the plurality of pre-collected samples.

10. The terminal device of claim 9, wherein the at least one processor is further configured to: normalize the first status feature information and the second status feature information to obtain normalized real numbers.

11. The terminal device of claim 7, wherein the at least one processor configured to determine the N applications most frequently indicated by the sample tags as the target application to be launched is configured to: acquire storage space information of the terminal device and determine the value of N according to the storage space information; and determine the N applications most frequently indicated by the sample tags as the target application to be launched.

12. The terminal device of claim 7, wherein the first status feature information comprises at least one of: time information, date category, switch status of mobile data network, connection status of a wireless hotspot, identity information of a connected wireless hotspot, a current running application, a previous foreground application, plugging and unplugging status of a headphone jack, charging status, power information of a battery, display duration of a screen, motion status of the terminal device, and location information of the terminal device.

13. A non-transitory computer readable storage medium storing a computer program which, when executed by a processor, causes the processor to:
acquire first status feature information of a terminal device in response to an application-preloading-prediction event being detected to be triggered;
compare the first status feature information with a plurality of pre-collected samples of a sample set, the plurality of pre-collected samples comprising second status feature information of the terminal device in a preset sampling period, and each sample of the plurality of pre-collected samples corresponding to a sample tag indicating a next application to be launched;
predict a target application to be launched according to a comparison result; and preload the target application;
wherein the at least one processor configured to predict the target application to be launched according to the comparison result is configured to: process the comparison result according to a K-nearest-neighbor (KNN) algorithm and predict the target application to be launched according to a processing result;
wherein the at least one processor configured to compare the first status feature information with the plurality of pre-collected samples of the sample set is configured to: for each pre-collected sample of the sample set, calculate a distance between the first status feature information and the sample through a preset algorithm, and obtaining a plurality of distances; wherein the at least one processor configured to process the comparison result according to the KNN algorithm and predict the target application to be launched according to the processing result is configured to: select K minimum distances from the plurality of distances; acquire sample tags corresponding to the K minimum distances; and determine N applications most frequently indicated by the sample tags as the target application to be launched.

14. The non-transitory computer readable storage medium of claim 13, wherein the processor is further configured to: acquire the second status feature information of the terminal device in the preset sampling period as the plurality of pre-collected samples; and monitor next applications to be launched and identifying them as the sample tags corresponding to the plurality of pre-collected samples.

15. The non-transitory computer readable storage medium of claim 14, wherein the processor is further configured to: normalize the first status feature information and the second status feature information to obtain normalized real numbers.

* * * * *